US011610216B2

(12) United States Patent
Suzuki et al.

(10) Patent No.: US 11,610,216 B2
(45) Date of Patent: Mar. 21, 2023

(54) INFORMATION PROCESSING APPARATUS, INFORMATION PROCESSING METHOD, AND PROGRAM

(71) Applicant: TOYOTA JIDOSHA KABUSHIKI KAISHA, Toyota (JP)

(72) Inventors: Koichi Suzuki, Miyoshi (JP); Toru Nishitani, Nisshin (JP); Jun Usami, Toyota (JP); Minami Yoda, Tokyo (JP); Kensuke Koike, Nisshin (JP); Tsuyoshi Ogawa, Okazaki (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 424 days.

(21) Appl. No.: 16/803,021

(22) Filed: Feb. 27, 2020

(65) Prior Publication Data
US 2020/0307649 A1 Oct. 1, 2020

(30) Foreign Application Priority Data
Mar. 25, 2019 (JP) .............................. JP2019-057366

(51) Int. Cl.
*G06Q 30/02* (2012.01)
*G06Q 10/02* (2012.01)
(Continued)

(52) U.S. Cl.
CPC .......... *G06Q 30/0207* (2013.01); *G06Q 10/02* (2013.01); *G06Q 30/0208* (2013.01); *G06Q 50/30* (2013.01)

(58) Field of Classification Search
CPC .............. G06Q 30/0207; G06Q 10/02; G06Q 30/0208; G06Q 50/30; G06Q 10/08355
(Continued)

(56) References Cited

U.S. PATENT DOCUMENTS

2015/0324735 A1* 11/2015 Lord ...................... G06Q 10/08
705/330
2019/0161060 A1* 5/2019 Yanagida .............. B60R 25/241
(Continued)

FOREIGN PATENT DOCUMENTS

| CN | 108985543 A | * | 12/2018 | ........... G05D 1/0088 |
| JP | 2003-315059 A | | 11/2003 | |
| JP | 2019082753 A | * | 5/2019 | ........... G05D 1/0217 |

OTHER PUBLICATIONS

Josh Dunham, Ride Sharing and Package Delivery is More Popular Than You Think, 2018 (Year: 2018).*

*Primary Examiner* — Tarek Elchanti
(74) *Attorney, Agent, or Firm* — Sughrue Mion, PLLC

(57) ABSTRACT

A control section of a server apparatus as an information processing apparatus in the disclosure executes: inquiring of a terminal of a user who desires to board a self-driving vehicle operating for pickup-delivery of an item, whether or not the user is able to handle work of pickup-delivery of the item at a pickup-delivery location between the self-driving vehicle and a pickup-delivery service user; and when a response indicating that the user is able to handle the work of pickup-delivery when the user is on board the self-driving vehicle is received from the terminal, transmitting to the self-driving vehicle an instruction to allow the user who desires to board and is able to handle the work of pickup-delivery to board the self-driving vehicle.

11 Claims, 10 Drawing Sheets

(51) Int. Cl.
*G06Q 50/30* (2012.01)
*G06Q 30/0207* (2023.01)
*G06Q 30/0208* (2023.01)

(58) Field of Classification Search
USPC .......................................... 701/23; 705/330
See application file for complete search history.

(56) References Cited

U.S. PATENT DOCUMENTS

2019/0340928 A1* 11/2019 Goldman ............... G08G 1/202
2020/0051194 A1* 2/2020 Park ....................... G06Q 50/28
2020/0273272 A1* 8/2020 Takikawa ........... G06Q 30/0645

* cited by examiner

INFORMATION PROCESSING APPARATUS, INFORMATION PROCESSING METHOD, AND PROGRAM

INCORPORATION BY REFERENCE

The disclosure of Japanese Patent Application No. 2019-057366 filed on Mar. 25, 2019 including the specification, drawings and abstract is incorporated herein by reference in its entirety.

BACKGROUND

1. Technical Field

The disclosure relates to an information processing apparatus, an information processing method executed by the information processing apparatus, and a program.

2. Description of Related Art

Conventionally, home-delivery services for delivering items to individual homes and the like have widely been available, and various ideas have further been proposed (for example, see Japanese Patent Application Publication No. 2003-315059).

SUMMARY

Besides, it is proposed to perform delivery of an item and pickup of an item with an unmanned vehicle. However, for example, handover of an item to an addressee at a delivery location is performed by a handler on board the vehicle. With respect to such handlers, it is desired to make improvements in terms of a reduction in labor costs. Accordingly, an object of the disclosure is to make it possible, in a pickup-delivery service, to ideally perform pickup-delivery work between a mobile object such as a vehicle for pickup-delivery of an item and a user of the service.

An aspect of the disclosure is illustrated by an information processing apparatus including a control section. The control section executes: inquiring of a terminal of a user who desires to board a mobile object operating for pickup-delivery of an item, whether or not the user is able to handle work of pickup-delivery of the item at a pickup-delivery location between the mobile object and a pickup-delivery service user; and when a response indicating that the user is able to handle the work of pickup-delivery when the user is on board the mobile object is received from the terminal, transmitting to the mobile object an instruction to allow the user who desires to board and is able to handle the work of pickup-delivery to board the mobile object. Another aspect of the disclosure is illustrated by an information processing method executed by at least one computer such as the information processing apparatus. Still another aspect of the disclosure is illustrated by a program for causing at least one computer such as the information processing apparatus to execute the information processing method.

According to the information processing apparatus, in a pickup-delivery service, it is possible to ideally perform pickup-delivery work between a mobile object such as a vehicle for pickup-delivery of an item and a user of the service.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an information processing apparatus, an information processing method executed by the information processing apparatus, and a program according to embodiments will be described with reference to the drawings. First, a first embodiment will be described.

Figure 1:
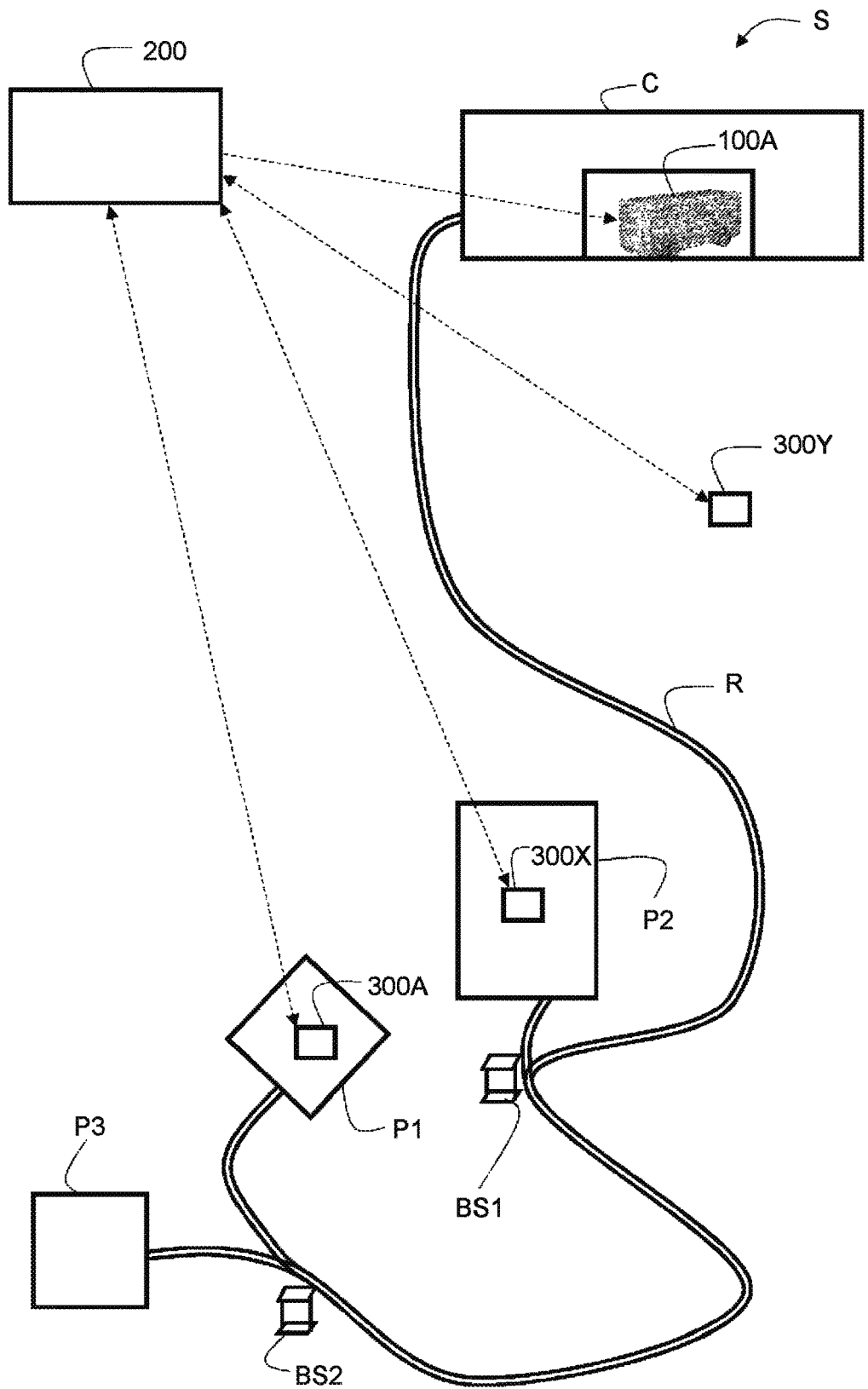
FIG. 1 is a conceptual diagram of an example of operation of a system according to a first embodiment.

FIG. 1 conceptually shows a pickup-delivery system S according to the first embodiment. The pickup-delivery system S includes self-driving vehicles 100 and a server apparatus 200. The self-driving vehicles 100 are an example of mobile object operating for pickup-delivery of an item. The server apparatus 200 is an information processing apparatus and is a computer on a network N. The server apparatus 200 is configured to be able to communicate with each self-driving vehicle 100 through the network N and cooperates with an information processing apparatus of each self-driving vehicle 100 through the network N. Note that although FIG. 1 only illustrates a self-driving vehicle 100A among the plurality of self-driving vehicles 100 (100A, 100B, . . . ), the number and the like of self-driving vehicles 100 are not limited, and there may be any number of self-driving vehicles 100.

The pickup-delivery system S is a system enabling at least any one of pickup and delivery, and may be a system in which both pickup and delivery are performed. The pickup-delivery system S can include one or more centers C. The center C may be a place where items to be loaded into the self-driving vehicles 100 are manufactured or gathered, and may be a place where items are gathered via the self-driving vehicles 100. The center C here is a manufacturing place for food and drink such as pizza, but also is a trans-shipment base for a home-delivery service.

FIG. 1 shows a state where the self-driving vehicle 100A is on standby in the center C. Each self-driving vehicle 100 can travel to a pickup-delivery location to pick up or deliver an item. In the pickup-delivery system S, first, when an item is picked up, a self-driving vehicle 100 travels toward a pickup location and gathers the item from the pickup location to a center C closest to the pickup location once. Then, the same or a different self-driving vehicle 100 transports the item from the center C to another center C closest to a delivery location. Further, the same or a different self-driving vehicle 100 transports the item from the other center C to the delivery location.

Here, the server apparatus 200 is provided outside the center C. The server apparatus 200 may be provided in the center C. The server apparatus 200 can also communicate with another server apparatus and the like through the network N. In addition to being configured to be able to communicate with each self-driving vehicle 100, the server apparatus 200 is also configured to be able to communicate with user apparatuses 300 through the network N.

Each user apparatus 300 is configured to be able to communicate with the server apparatus 200 through the network N. Although FIG. 1 illustrates only user apparatuses 300A, 300X, 300Y among the plurality of user apparatuses 300 (300A, . . . ), the number and the like of user apparatuses are not limited, and there may be any number of user apparatuses.

The self-driving vehicles 100 are also referred to as electric vehicle (EV) pallets. The self-driving vehicles 100 are mobile objects capable of automatic operation and unmanned operation and exist in various sizes. For example, the self-driving vehicles 100 of various sizes, ranging from a small size allowing loads of few items and only one occupant to large sizes, can be used. In the embodiment particularly, the self-driving vehicles 100 are vehicles capable of carrying mixed loads of cargo and people, and capable of not only transporting items but also transporting people, that is, allowing people to board.

Each self-driving vehicle 100 includes a control function for controlling the self-driving vehicle 100 itself and a communication function. Each self-driving vehicle 100 cooperates with the server apparatus on the network N and can provide a function and a service added by the server apparatus on the network to a user, in addition to processing that can be executed by the self-driving vehicle 100 alone. Note that the self-driving vehicles 100 are not necessarily unmanned vehicles. For example, sales staff, service staff, maintenance staff, or the like may be on board. The self-driving vehicles 100 are not necessarily fully self-driving capable vehicles. For example, the self-driving vehicles 100 may be vehicles that are driven or assisted in driving by people depending on circumstances.

Each self-driving vehicle 100 is also configured to be able to communicate with the user apparatuses 300 (300A, . . . ) through the network N. Each user apparatus 300 receives an input and an operation equivalent to an input from a user and can communicate with not only the server apparatus 200 but also the self-driving vehicles 100 through the network N. Note that the user apparatuses 300 may directly perform transmission to and reception from the self-driving vehicles 100.

The server apparatus 200 is an apparatus that instructs the self-driving vehicles 100 about operation. For example, the server apparatus 200 transmits to each self-driving vehicle 100 an operational instruction about what item is delivered to a delivery location or picked up from a pickup location and when the item is delivered or picked up, that is, about pickup-delivery.

Figure 2:
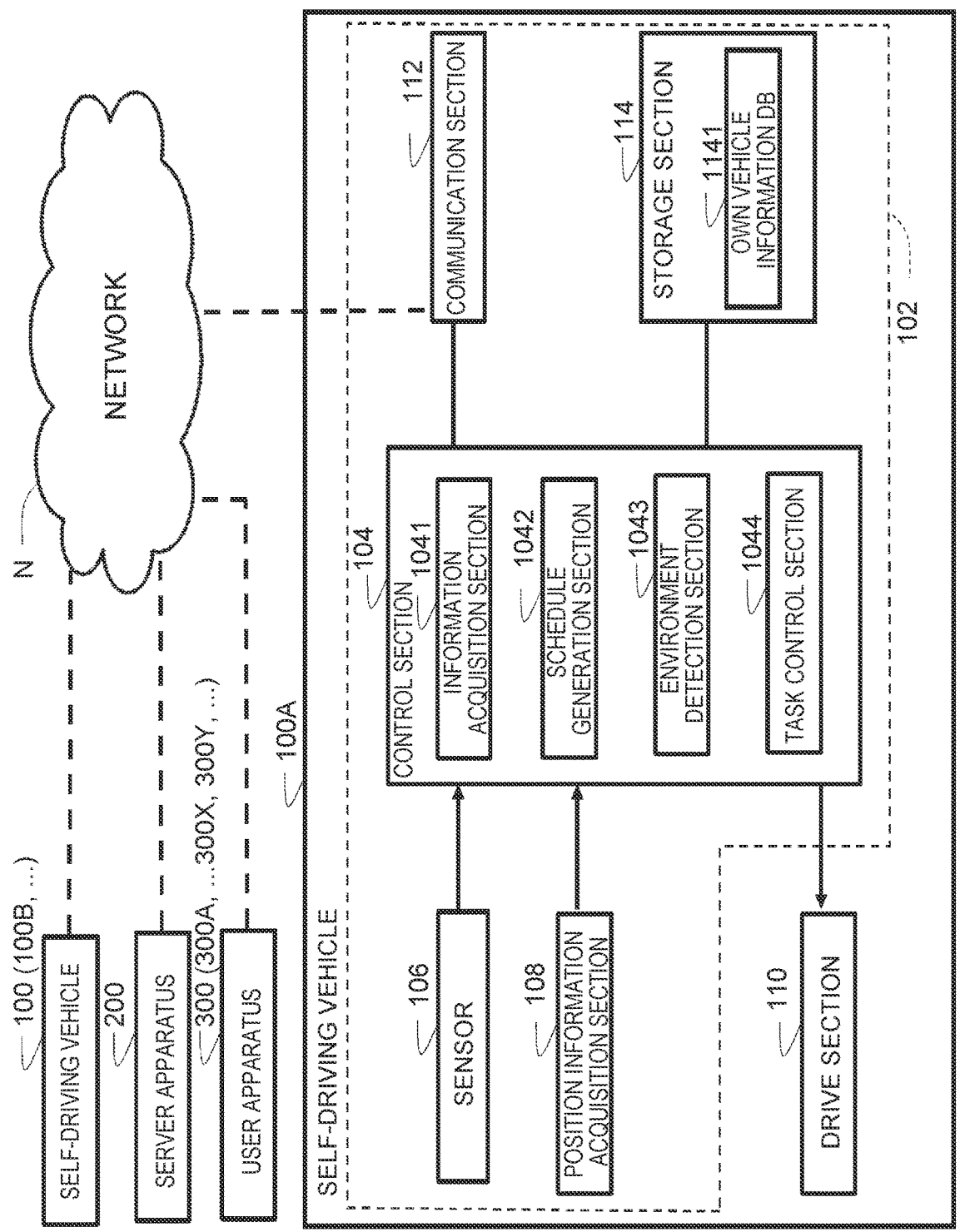
FIG. 2 is a block diagram schematically showing a configuration of the system in FIG. 1, particularly showing a configuration of a self-driving vehicle.

Hereinafter, each component of the pickup-delivery system S in FIG. 1 will be described in detail. FIG. 2 is a block diagram schematically showing a configuration of the pickup-delivery system S including the self-driving vehicles 100, the server apparatus 200, and the user apparatuses 300, particularly showing a configuration of the self-driving vehicle 100A. Note that FIG. 2 shows the configuration of the self-driving vehicle 100A, as an example of the self-driving vehicles 100. Each of the self-driving vehicle 100B and others includes components similar to components of the self-driving vehicle 100A.

The self-driving vehicle 100A in FIG. 2 includes an information processing apparatus 102, which includes a control section 104 that is substantially in charge of functions of the information processing apparatus 102. The self-driving vehicle 100A can perform traveling and the like in accordance with an operational instruction acquired from the server apparatus 200. Specifically, the self-driving vehicle 100A travels by using an appropriate method while sensing surroundings of the vehicle, based on the operational instruction acquired through the network N. During the traveling, the self-driving vehicle 100A performs processing related to pickup-delivery of an item and boarding and alighting of various users, based on the operational instruction.

The self-driving vehicle 100A further includes a sensor 106, a position information acquisition section 108, a drive section 110, a communication section 112, and a storage section 114. The self-driving vehicle 100A operates by using electric power supplied from a battery.

The sensor 106 is means for sensing the surroundings of the vehicle and typically includes a stereo camera, a laser scanner, a light detection and ranging, a laser imaging detection and ranging (LIDAR), a radar, and the like. Information acquired by the sensor 106 is transmitted to the control section 104. The sensor 106 includes a sensor for the own vehicle to perform self-driving. The sensor 106 may include a camera provided on a body of the self-driving vehicle 100A. For example, the sensor 106 can include an imaging device using an image sensor such as a charged-coupled device (CCD) sensor, a metal-oxide-semiconductor (MOS) sensor, or a complementary metal-oxide-semiconductor (CMOS) sensor. A plurality of cameras may be provided at a plurality of places on the body. For example, cameras may be provided on a front, a rear, and right and left sides of the body.

The position information acquisition section 108 is means for acquiring a current position of the vehicle and typically includes a Global Positioning System (GPS) receiver and the like. Information acquired by the position information acquisition section 108 is transmitted to the control section 104. The GPS receiver as a satellite signal receiver receives signals from a plurality of GPS satellites. Each GPS satellite is an artificial satellite orbiting the earth. A satellite positioning system, that is, a navigation satellite system (NSS) is not limited to the GPS. Position information may be detected based on signals from various satellite positioning systems. The NSS is not limited to the global navigation satellite system and can include the quasi-zenith satellite system. For example, the NSS can include "Galileo" of Europe and "Michibiki" of Japan operated in combination with the GPS.

The control section 104 is a computer that controls the self-driving vehicle 100A, based on the information acquired from the sensor 106, the position information acquisition section 108, and the like. The control section 104 is an example of control means for controlling traveling of the self-driving vehicle 100A, which is a mobile object, work of pickup-delivery of an item, and work for boarding and alighting of various users, by receiving the operational instruction from the server apparatus 200.

The control section 104 includes a CPU and a main storage section and executes information processing based on a program. The CPU is also referred to as a processor. The main storage section of the control section 104 is an example of a main storage device. The CPU of the control section 104 executes a computer program deployed in the main storage section in an executable manner and provides various functions. The main storage section of the control section 104 stores the computer program executed by the CPU, data, and the like. The main storage section of the control section 104 is a dynamic random access memory (DRAM), a static random access memory (SRAM), a read only memory (ROM), or the like.

The control section 104 is connected to the storage section 114. The storage section 114 is a so-called external storage section, is used for an auxiliary storage area to the main storage section of the control section 104, and stores the computer program executed by the CPU of the control section 104, data, and the like. The storage section 114 is a hard disk drive, a solid state drive (SSD), or the like.

The control section 104 includes, as function modules, an information acquisition section 1041, a schedule generation section 1042, an environment detection section 1043, and a task control section 1044. Each of the function modules is implemented in such a manner that a program stored in the main storage section or the storage section 114 is executed by the control section 104, that is, the CPU of the control section 104.

The information acquisition section 1041 acquires information in the operational instruction from the server apparatus 200. The operational instruction includes pickup-delivery information and boarding information associated with the pickup-delivery information. The pickup-delivery information can include information on an item subject to pickup-delivery, a size of the item, a pickup-delivery location, a scheduled time of picking up or delivering the item, a pickup-delivery route, and/or scheduled times of passing the pickup-delivery route. The boarding information can include information on a user (for example, a user ID) and information on a boarding place and/or an alighting place. Note that the information acquisition section 1041 regularly or irregularly acquires information on the own vehicle, acquires, for example, information on a loaded item, and stores the information in an own vehicle information database 1141 of the storage section 114.

The schedule generation section 1042 generates a schedule of operation of the own vehicle, based on the information in the operational instruction acquired from the server apparatus 200. Note that the schedule of operation generated by the schedule generation section 1042 is transmitted to the task control section 1044, which will be described later. In the embodiment, the schedule of operation is data that defines a route to be traveled by the self-driving vehicle 100A and processing to be performed by the self-driving vehicle 100A on part or the whole of the route. The following are examples of the data included in the schedule of operation.

(1) A data route to be traveled by the own vehicle, obtained by expressing a route or a path to be traveled by the own vehicle by using a set of road links, may be automatically generated, for example, by referring to map data stored in the storage section 114 and using pickup-delivery route information included in the operational instruction for a base, based on a given departure place and a given destination. The route may be generated by using an external service.

(2) Processing to be performed by the own vehicle on the data route, which indicates processing to be performed by the own vehicle at points on the route, includes, but is not limited to, for example, "reception of an item", "handover of the item", "boarding of a user", "alighting of the user", and "reception of a receipt and a consignment note".

The environment detection section 1043 detects an environment around the vehicle, based on the data acquired by the sensor 106. Targets of detection include, but are not limited to, for example, the number and positions of lanes, the number and positions of vehicles existing around the own vehicle, the number and positions of obstacles (for example, pedestrians, bicycles, structures, and constructions) existing around the own vehicle, structure of a road, and road signs. A target of detection can be anything that is necessary to perform self-driving. The environment detection section 1043 may track a detected object. For example, a relative velocity of an object may be calculated from a difference between coordinates of the object detected one step before and current coordinates of the object. Environment-related data (hereinafter, environment data) detected by the environment detection section 1043 is transmitted to the task control section 1044, which will be described later.

The task control section 1044 controls operation, that is, traveling of the own vehicle, which is a mobile object, based on the schedule of operation generated by the schedule generation section 1042, the environment data generated by the environment detection section 1043, and the position information on the own vehicle acquired by the position information acquisition section 108. For example, the task control section 1044 causes the own vehicle to travel along the predetermined route and to travel such that no obstacle comes within a predetermined safe area centered on the own vehicle. For a method of causing the vehicle to perform self-driving, a known method can be adopted. The control of traveling of the self-driving vehicle 100A is performed based on the pickup-delivery information and the boarding information. The task control section 1044 also executes tasks other than the traveling, based on the schedule of operation generated by the schedule generation section 1042. By way of illustration, the tasks can include boarding and alighting of users, issue of a receipt and a consignment note, and the like.

The drive section 110 is means for causing the self-driving vehicle 100A to travel, based on an instruction generated by the task control section 1044. The drive section 110 includes, for example, a motor and an inverter for driving wheels, a brake, a steering system, and a secondary battery.

The communication section 112 includes communication means for connecting the self-driving vehicle 100A to the network N. In the embodiment, the self-driving vehicle 100A can communicate with other apparatuses, for example, the server apparatus 200 and the user apparatuses 300, through the network N. Note that the communication section 112 may further include communication means for allowing the self-driving vehicle 100A, which is the own vehicle, to perform vehicle-to-vehicle communication with other self-driving vehicles 100 (100B, . . . ).

Next, the server apparatus 200 will be described. The server apparatus 200 is an apparatus that acquires a request for pickup-delivery of an item from a user apparatus 300

(300A, . . . ) and, based on the request, generates and transmits an operational instruction to a self-driving vehicle 100 (100A, . . . ). The server apparatus 200 is an apparatus that receives a request for boarding from a user apparatus 300 and, based on the request, generates and transmits an operational instruction to the self-driving vehicle 100.

Figure 3:
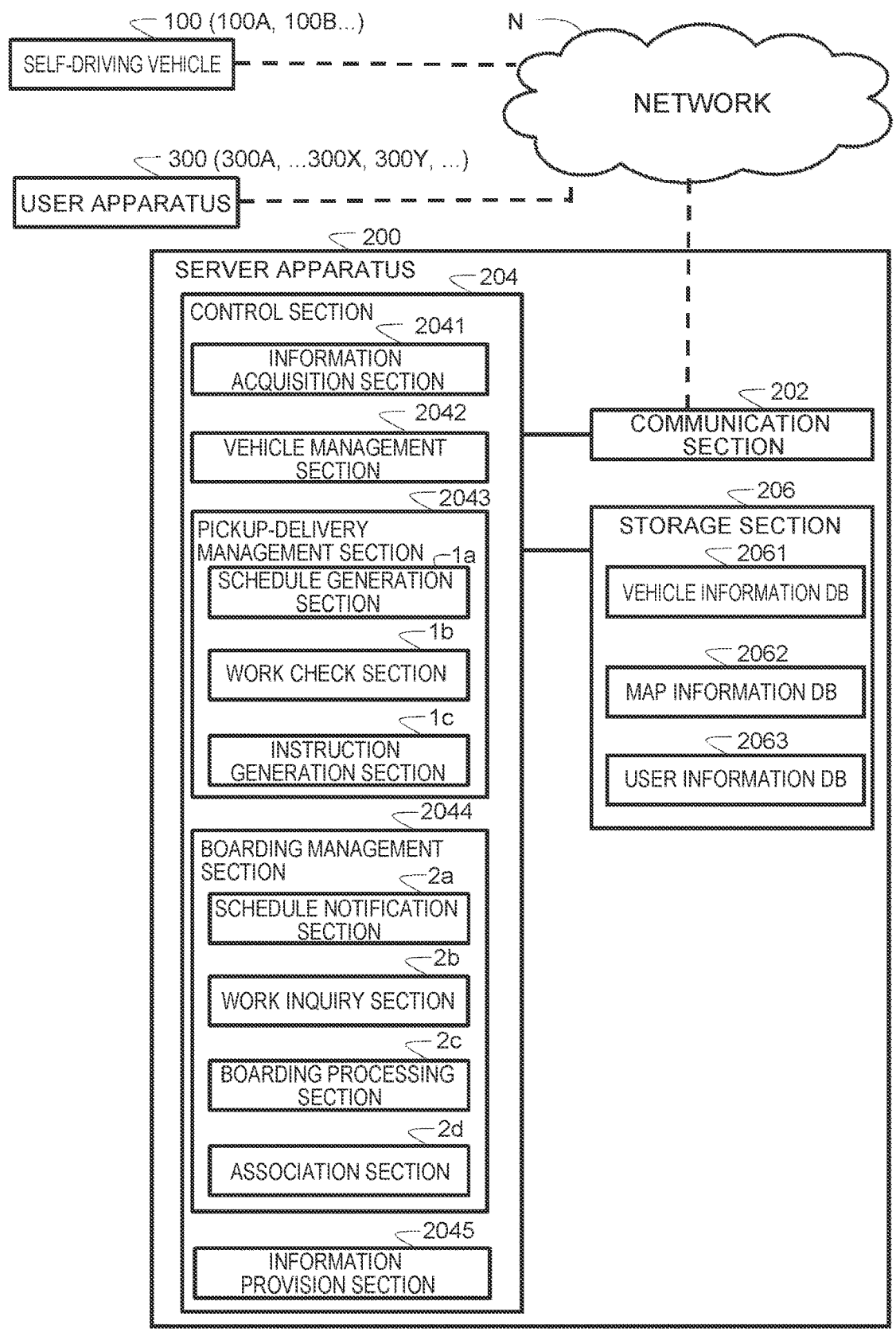
FIG. 3 is a block diagram schematically showing the configuration of the system in FIG. 1, particularly showing a configuration of a server apparatus.

The server apparatus 200 is an information processing apparatus and includes a communication section 202, a control section 204, and a storage section 206 as shown in FIG. 3. The communication section 202 is similar to the communication section 112 and includes a communication function for connecting the server apparatus 200 to the network N. The communication section 202 of the server apparatus 200 is a communication interface for communicating with the self-driving vehicles 100 and the user apparatuses 300 through the network N. The control section 204 includes a CPU and a main storage section similarly to the control section 104 and executes information processing based on a program. Needless to say, the CPU is also a processor, and the main storage section of the control section 204 is also an example of a main storage device. The CPU of the control section 204 executes a computer program deployed in the main storage section in an executable manner and provides various functions. The main storage section of the control section 204 stores the computer program executed by the CPU, data, and the like. The main storage section of the control section 204 is a DRAM, an SRAM, a ROM, or the like.

The control section 204 is connected to the storage section 206. The storage section 206 is an external storage section, is used for an auxiliary storage area to the main storage section of the control section 204, and stores the computer program executed by the CPU of the control section 204, data, and the like. The storage section 206 is a hard disk drive, an SSD, or the like.

The control section 204 is means in charge of controlling the server apparatus 200. As shown in FIG. 3, the control section 204 includes, as function modules, an information acquisition section 2041, a vehicle management section 2042, a pickup-delivery management section 2043, a boarding management section 2044, and an information provision section 2045. The pickup-delivery management section 2043 includes a schedule generation section 1a, a work check section 1b, and an instruction generation section 1c. The boarding management section 2044 includes a schedule notification section 2a, a work inquiry section 2b, a boarding processing section 2c, and an association section 2d. Each of the function modules is implemented in such a manner that a program stored in the main storage section or the storage section 206 is executed by the CPU of the control section 204.

The information acquisition section 2041 acquires various information from any self-driving vehicle 100 and any user apparatus 300, for example, a request for pickup-delivery from a user apparatus 300 of a pickup-delivery service user. The information acquisition section 2041 then transmits the acquired information to the pickup-delivery management section 2043 and the boarding management section 2044. The information acquisition section 2041 regularly acquires position information, information in the own vehicle information database 1141, and the like from each self-driving vehicle 100 and transmits the acquired information to the vehicle management section 2042.

The vehicle management section 2042 manages information on a plurality of self-driving vehicles 100 under management. Specifically, the vehicle management section 2042 receives from the plurality of self-driving vehicles 100, at a predetermined cycle, information such as data related to each self-driving vehicle 100 via the information acquisition section 2041, and stores the received information in a vehicle information database 2061 of the storage section 206. For the information related to each self-driving vehicle 100, position information and vehicle information are used. The vehicle information includes, for example, an identifier, a purpose of use and a type, information about a standby point (a depot or a business office), a door type, a body size, a luggage compartment size, a payload, a distance that can be traveled at time of full charge, a distance that can be traveled at a current time point, and current status of the self-driving vehicle 100. However, the vehicle information may include other information. Note that the current status includes information indicating a state of loads of items subject to pickup-delivery and a state of pickup-delivery, which includes, for example, information on sizes and the number of loaded items, and information on whether the items are unloaded or loaded at respective pickup-delivery locations.

The pickup-delivery management section 2043 generates a schedule of pickup-delivery based on the information acquired by the information acquisition section 2041 and generates an operational instruction including pickup-delivery information as mentioned earlier. The generation of the schedule includes generation of schedule information on the pickup-delivery (hereinafter, schedule information) such as a pickup-delivery route and scheduled times of passing the pickup-delivery route. To generate the pickup-delivery route and the like, the schedule generation section 1a refers to a map information database 2062 of the storage section 206. Further, the generation of the schedule includes determination of a vehicle suitable for the pickup-delivery of an item. For example, a vehicle may be determined based on a size of the item subject to pickup-delivery, an address of a pickup-delivery location, and a scheduled date and time of pickup-delivery. When the determination is performed, the schedule generation section 1a searches the vehicle information database 2061. The work check section 1b inquires of a user apparatus 300 that is a terminal of a pickup-delivery service user, to check whether or not it is desired to have any other person than the pickup-delivery service user handle work related to the pickup-delivery of the item (hereinafter, pickup-delivery work) between the self-driving vehicle and the pickup-delivery service user at the pickup-delivery location. The instruction generation section 1c generates the operational instruction based on the pickup-delivery information including the schedule information generated by the schedule generation section 1a, and on boarding information including information on a boarding seeker, which will be described later, associated with the pickup-delivery information by the association section 2d of the boarding management section 2044.

With respect to the pickup-delivery in the schedule information generated by the schedule generation section 1a of the pickup-delivery management section 2043, the boarding management section 2044 solicits a user who desires to board the self-driving vehicle engaged in the pickup-delivery, and allows the user who desires to board to handle the pickup-delivery work. The schedule notification section 2a of the boarding management section 2044 solicits a user who desires to board the self-driving vehicle as a mobile object engaged in the pickup-delivery. For the solicitation, the schedule notification section 2a publicizes the schedule information generated by the schedule generation section 1a of the pickup-delivery management section 2043 on a predetermined site or notifies the schedule information to user apparatuses 300 that are terminals of registered users. Any one of the publication and the notification may be performed, or both may be performed. For transmission to the user apparatuses 300 of the registered users, a user information database 2063 of the storage section 206 is referred to. The predetermined site may be configured to allow access only from the registered users, but may be configured to place no access restriction. When there is a user who desires to board the self-driving vehicle, the work inquiry section 2b of the boarding management section 2044 inquires of a terminal of the user who desires to board whether or not the pickup-delivery work on the item between the self-driving vehicle and the pickup-delivery service user can be handled at the pickup-delivery location. The boarding processing section 2c performs determination of whether or not boarding of the user who desires to board can be settled, for example, determination of whether a boarding place and an alighting place desired by the user meet predetermined conditions, and the like, and then processes and accepts a request for boarding of the user who desires to board. When the boarding processing section 2c accepts the request for boarding of the user who desires to board, the association section 2d transmits boarding information related to the request for boarding to the instruction generation section 1c of the pickup-delivery management section 2043, and associates the boarding information with the pickup-delivery information. The boarding information includes the boarding place and the alighting place desired by the user who desires to board. The boarding information also includes information about whether or not the pickup-delivery work can be handled.

The information provision section 2045 provides the information in the operational instruction generated by the instruction generation section 1c of the pickup-delivery management section 2043 to the self-driving vehicle 100 determined by the schedule generation section 1a. The information in the operational instruction includes the pickup-delivery information and the boarding information.

Next, the user apparatuses 300 will be described. Each user apparatus 300 is a user terminal and is, for example, a mobile terminal, a smartphone, a personal computer, or the like. The user apparatus 300A in FIG. 4 as an example includes a communication section 302, a control section 304, and a storage section 306. The communication section 302 and the storage section 306 of the user apparatus 300A are similar to the communication section 202 and the storage section 206 of the server apparatus 200, respectively. Further, the user apparatus 300A includes a display section 308 and an operation section 310. The display section 308 is, for example, a liquid crystal display, an electroluminescent panel, or the like. The operation section 310 may be, for example, a keyboard, a pointing device, or the like. More specifically, in the embodiment, the operation section 310 includes a touch panel and is practically integrated with the display section 308 into a single unit.

The control section 304 includes a CPU and a main storage section, similarly to the control section 204 of the server apparatus 200. The CPU of the control section 304 executes an application program (hereinafter, application) 3061 stored in the storage section 306. The application 3061 is an application program for accessing information notified from a web browser or the server apparatus 200. The application 3061 includes a GUI, and receives an input, for example, access from the user and transmits the input to the server apparatus 200 through the network N. A pickup-delivery service user can input a request for pickup-delivery and a request for boarding and transmit the requests to the server apparatus 200 via the user apparatus 300.

Figure 4:
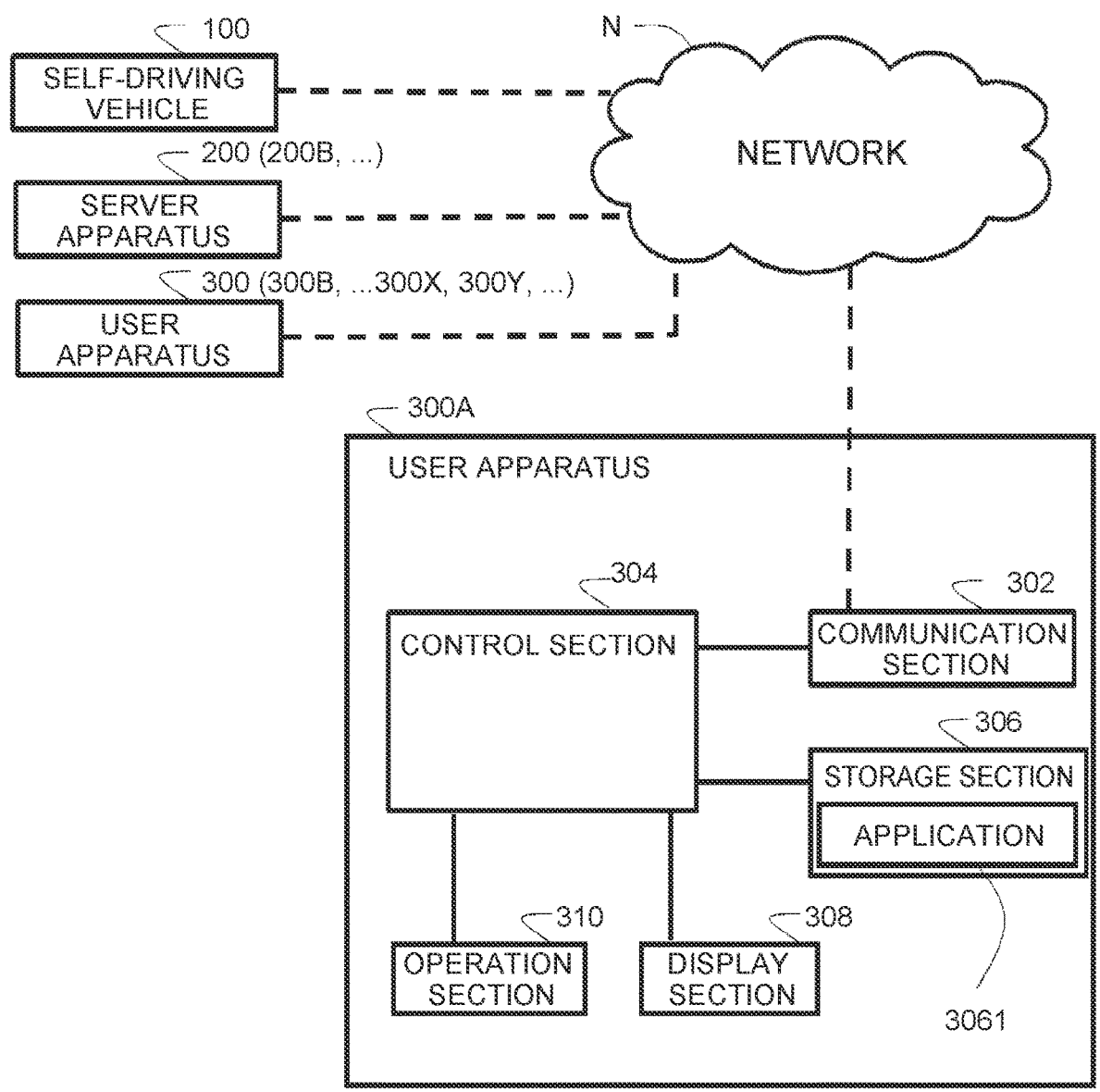
FIG. 4 is a block diagram schematically showing the configuration of the system in FIG. 1, particularly showing a configuration of a user apparatus.

Note that in FIGS. 2, 3, and 4, the self-driving vehicles 100, the server apparatus 200, and the user apparatuses 300 are connected through the single network N. However, the connections may be implemented through a plurality of networks. For example, a network connecting the self-driving vehicles 100 and the server apparatus 200 and a network connecting the server apparatus 200 and the user apparatuses 300 may be different networks.

Processing in the pickup-delivery system S having the above-described configuration will be described based on FIGS. 5 to 7. First, processing in the server apparatus 200 will be described based on FIG. 5. Note that in the following, a user U is a pickup-delivery service user, a terminal apparatus of the user U is the user apparatus 300A, and a self-driving vehicle 100 used for pickup-delivery of an item of the user U is the self-driving vehicle 100A. In the following, a pickup-delivery service desired by the user U is, for example, delivery of pizza. However, the pickup-delivery service may be any other service such as delivery of an item to or pickup of an item from a home, a company, or any other organization. In the following, it is assumed that pickup-delivery includes at least one of pickup and delivery.

When a request for pickup-delivery from the user U, who is a pickup-delivery service user, is transmitted from the user apparatus 300A, the schedule generation section 1a of the pickup-delivery management section 2043 in the control section 204 of the server apparatus 200 acquires the request for pickup-delivery (affirmative determination in step S501). The request for pickup-delivery here includes, for example, a type and a size of an item subject to pickup-delivery and a scheduled time of pickup-delivery. For example, the request for pickup-delivery includes information to the effect that it is desired to have one pizza be delivered at 18:30 today. Here, it is determined whether or not work information is included in the request for pickup-delivery (step S503). The work information is information about whether or not it is desired to have someone handle pickup-delivery work between the user U, who is a user at a pickup-delivery location, and the self-driving vehicle. When work information is not included in the request for pickup-delivery (negative determination in step S503), the work check section 1b of the pickup-delivery management section 2043 in the control section 204 of the server apparatus 200 inquires of the user apparatus 300A of the user U whether or not it is desired to have the pickup-delivery work be handled (step S505).

The schedule generation section 1a of the pickup-delivery management section 2043 in the control section 204 of the server apparatus 200 accepts the request for pickup-delivery and therefore generates schedule information for the request. The schedule information is generated in accordance with a predetermined program and includes a pickup-delivery route, scheduled times of passing the route, a scheduled time of pickup-delivery at the pickup-delivery location, and the like. At the time, the schedule generation section 1a determines the self-driving vehicle 100A as a mobile object engaged in the pickup-delivery. When the schedule generation section 1a accepts the request for pickup-delivery, the schedule notification section 2a of the boarding management section 2044, for example, notifies the schedule information on the pickup-delivery to terminals of registered users a predetermined time period before the scheduled time of pickup-delivery, in order to solicit a user who desires to board the self-driving vehicle 100A (step S507). In the case of FIG. 1, the schedule information is notified to the user apparatus 300X of a user X and the user apparatus 300Y of a user Y. Further, in order to solicit a user who desires to board the self-driving vehicle 100A, the schedule notification section 2*a* publicizes the schedule information on the pickup-delivery on a predetermined site (step S507). Here, the schedule information is publicized on a site that can be accessed only by the registered users.

As a result, when a request for boarding as a response is received from the user apparatus 300X of the third-party user X (affirmative determination in step S509), the work inquiry section 2*b* of the boarding management section 2044 determines whether or not a response indicating that it is desired to have the pickup-delivery work be handled is received from the user U (step S511). When it is desired by the user U to have the pickup-delivery work be handled (affirmative determination in step S511), the work inquiry section 2*b* inquires of the user apparatus 300X, which is a terminal of the user X, whether or not the user X can handle the pickup-delivery work when the user X is on board the self-driving vehicle (step S513). On the other hand, when a response indicating that the pickup-delivery work is unneeded is received from the user apparatus 300A of the user U (negative determination in step S511), the inquiry about whether or not the user X can handle the pickup-delivery work (step S513) is avoided (stopped). At the time, an incentive is granted to the user U (step S514). Examples of the incentive include a discount on a pickup-delivery fee. Note that here, the stop of the inquiry and the grant of the incentive are executed by the work inquiry section 2*b*.

The boarding processing section 2*c* of the boarding management section 2044 then determines whether or not the request for boarding of the user X who desires to board meets predetermined conditions (step S515). For the predetermined conditions, it is defined that a boarding place and an alighting place desired by the user X are located within a predetermined range from the pickup-delivery route for the user U, or the like. For the predetermined conditions, it is defined whether or not occupants are within a riding capacity, determined based on an unoccupied space in the self-driving vehicle 100A when the pickup-delivery service is performed for the user U, or the like. Note that the schedule information on the pickup-delivery notified to the terminals of the registered users and publicized on the predetermined site in step S507 may include information about a vacancy, as information for solicitating a user who desires to board. For example, it is assumed that the riding capacity is three people, one of which is for a user who handles the pickup-delivery work. When boarding of two users who do not handle the pickup-delivery work is settled and when the user X cannot handle the pickup-delivery work, the boarding processing section 2*c* determines that the request for boarding of the user X does not meet the predetermined conditions. For example, when a quota of users who handle the pickup-delivery work (for example, 1 person) is already filled with a user X0 who handles the pickup-delivery work and boarding of which is already settled, and further when the user X desires to handle the pickup-delivery work, the boarding processing section 2*c* determines that the request for boarding of the user X does not meet the predetermined conditions (negative determination in step S515). However, the boarding processing section 2*c* may check whether or not it is an essential condition for boarding to fulfill the desire of the user X to handle the pickup-delivery work, and when the pickup-delivery work is not an essential condition for boarding, processing may be performed by treating the user X as a user who does not handle the pickup-delivery work. By limiting the number of users X who desire to handle the pickup-delivery work as described above, more ordinary users who do not handle the pickup-delivery work can board. If the boarding processing section 2*c* allows users to board unconditionally, irrespective of whether or not the users can handle the work, the unoccupied space can be effectively used because it is easier to solicit second and subsequent boarding seekers. However, the quota of users who handle the pickup-delivery work is not limited to one person. According to the processing as described above, the boarding processing section 2*c* can strike a balance between enhancement of a service provided to a user at a pickup-delivery location and effective use of an unoccupied space, as a result of a user who desires to board a self-driving vehicle 100 engaged in pickup-delivery conducting pickup-delivery work at the pickup-delivery location. At the time, a notification indicating that boarding of the user X is disallowed is transmitted to the user apparatus 300X of the user X (step S517). On the other hand, when the quota of users who handle the pickup-delivery work is not filled yet, the boarding processing section 2*c* accepts a response indicating that the user X can handle the pickup-delivery work from the user apparatus 300X of the user X. When the request for boarding of the user X meets other conditions of the predetermined conditions (affirmative determination in step S515), the boarding processing section 2*c* settles boarding of the user X and transmits a notification to that effect to the user apparatus 300X of the user X (step S519). Note that at the time, the boarding processing section 2*c* grants an incentive to the user X who accepts handling the pickup-delivery work. Examples of the incentive include a discount on a fare charged on the user X and a discount on a fee that can be applied when the user X uses the pickup-delivery service.

When the number of settled users who board the self-driving vehicle 100A reaches the riding capacity, the boarding processing section 2*c* determines that the self-driving vehicle 100A is full up (affirmative determination in step S521). When the self-driving vehicle 100A is not filled to the riding capacity (negative determination in step S521), the processing returns to step S507. Note that at the time, the then number of vacancies may be included in the schedule information notified and publicized.

When no user who desires to board appears a predetermined time period before the scheduled time of pickup-delivery (negative determination in step S509) even when there is a vacancy in the self-driving vehicle 100A, it is determined whether or not it is desired by the user U to have the pickup-delivery work be handled (step S523). When it is not desired by the user U to have the pickup-delivery work be handled (negative determination in step S523), the processing advances to step S529. When it is desired by the user U to have the pickup-delivery work be handled (affirmative determination in step S523), it is determined whether or not a user who desires to board and can handle the pickup-delivery work is yet to be settled (step S525). When a user who desires to board and can handle the pickup-delivery work is yet to be settled (affirmative determination in step S525), the boarding processing section 2*c* transmits to the user apparatus 300A of the user U a notification indicating that the pickup-delivery work is not provided in the pickup-delivery service for the user U.

The association section 2*d* of the boarding management section 2044 transmits boarding information on the user who desires to board to the pickup-delivery management section 2043 and associates the boarding information with the pickup-delivery information (step S529). Thus, the instruction generation section 1*c* of the pickup-delivery management section 2043 generates an operational instruction including the pickup-delivery information and the boarding information (step S531). The information provision section 2045 of the control section 204 provides, that is, transmits the information in the operational instruction to the self-driving vehicle 100A (step S533). For example, it is assumed that the control section 204 of the server apparatus 200 accepts from the user apparatus 300X a response indicating that the user X can handle the pickup-delivery work when the user X is on board the self-driving vehicle 100A. In such a case, the control section 204 transmits to the self-driving vehicle 100A the operational instruction in which the boarding information indicating that the user X who desires to board and can handle the pickup-delivery work is allowed to board the self-driving vehicle 100A is associated with the pickup-delivery information.

Figure 5:
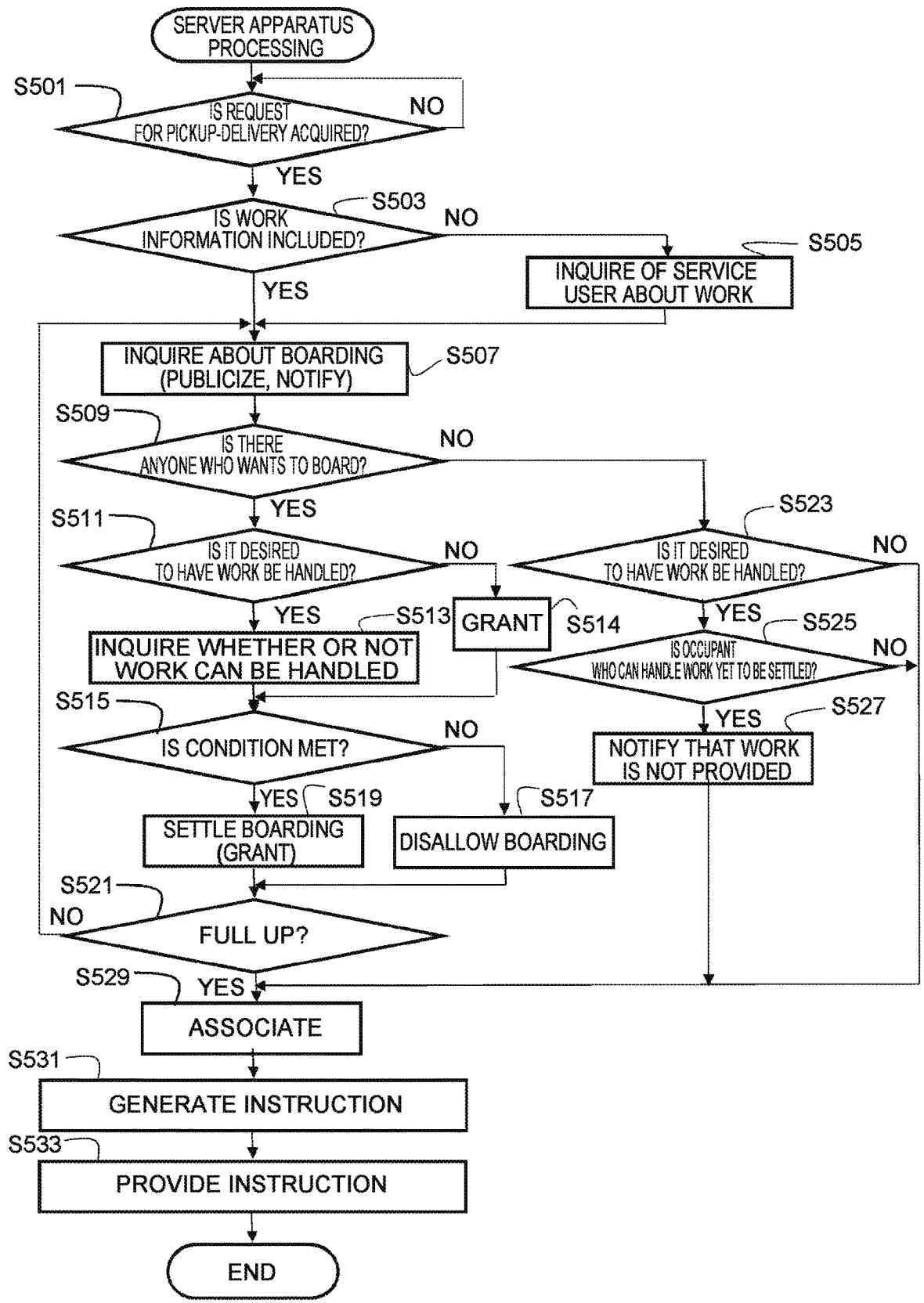
FIG. 5 is a flowchart of processing in the server apparatus, in the system in FIG. 1.
Figure 6:
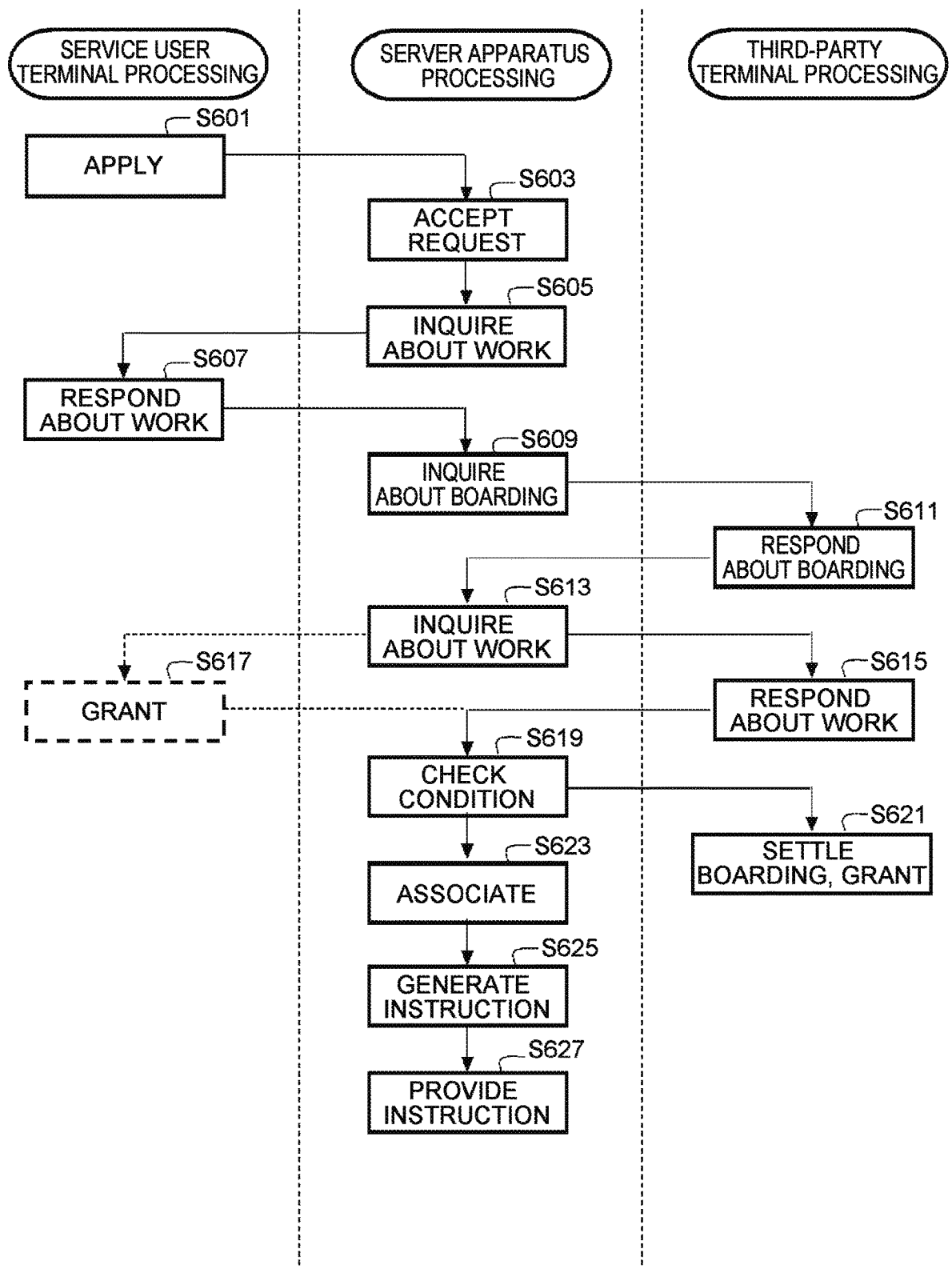
FIG. 6 is a diagram for describing an example of processing among the server apparatus, a terminal of a pickup-delivery service user, and a terminal of a third party who desires to board, in the system in FIG. 1.

The processing in the server apparatus 200 described based on FIG. 5 will further be described based on FIG. 6. FIG. 6 shows the processing in the server apparatus 200 in a middle column, shows processing in the user apparatus 300A of the user U who is a pickup-delivery service user in a left-side column, and shows processing in the user apparatus 300X of the user X who desires to board in a right-side column. The series of processing are depicted with passage of time going from an upper side to a lower side of FIG. 6. The processing in FIG. 6 is an example of processing performed when the riding capacity of the self-driving vehicle 100A is one person.

When the user U performs transmission for applying a request for pickup-delivery via the user apparatus 300A (step S601), the server apparatus 200 receives and accepts the request for pickup-delivery (step S603, corresponding to step S501). When work information is not included in the request for pickup-delivery, the server apparatus 200 transmits to the user apparatus 300A an inquiry about whether or not it is desired to have pickup-delivery work be handled (step S605). The user apparatus 300A having received the inquiry transmits to the server apparatus 200 a response indicating that it is desired to have the pickup-delivery work be handled (step S607).

The server apparatus 200 having accepted the request for pickup-delivery transmits to terminals of registered users a notification for soliciting a user who desires to board the self-driving vehicle 100A engaged in the pickup-delivery for the user U (step S609, corresponding to step S507). Here, the transmission-destination terminals are the user apparatus 300X of the user X and the user apparatus 300Y of the user Y shown in FIG. 1. The notification includes the schedule information. Here, the schedule information includes a route R from the center C to a pickup-delivery location P1 in FIG. 1 as a pickup-delivery route, and a scheduled time of pickup-delivery. The user X can consider boarding the self-driving vehicle 100A, according to an own convenience. It is assumed that the user X thinks of moving around the schedule time of pickup-delivery, for example, from a first point P2, which is a home of the user X, to a second point P3 shown in FIG. 1. The user X therefore returns a request indicating that the user X desires to board the self-driving vehicle 100A, via the user apparatus 300X (step S611). At the time, the request for boarding includes a bus stop BS1 as a desired boarding place and a bus stop BS2 as a desired alighting place, but does not include information about the pickup-delivery work. Here, when the response from the user U about the pickup-delivery work (step S607) indicates that it is desired to have the pickup-delivery work be handled, the server apparatus 200 inquires of the user apparatus 300X whether or not the pickup-delivery work can be handled (step S613). In response, when the user X can handle the pickup-delivery work, the user apparatus 300X returns a response indicating that the pickup-delivery work can be handled; otherwise the user apparatus 300X returns a response indicating that the pickup-delivery work cannot be handled (step S615, corresponding to step S513). On the other hand, when the response from the user U about the pickup-delivery work (step S607) indicates that it is not desired to have the pickup-delivery work be handled, or when the pickup-delivery work is unneeded, the pickup-delivery work can be saved, and therefore an incentive for the saving is granted to the user U (step S617, corresponding to step S514). For the incentive, for example, a discount on a pickup-delivery fee is provided.

When the request for boarding is received and the response about the pickup-delivery work is received from the user apparatus 300X of the user X, it is determined whether or not a condition of the request for boarding meets the predetermined conditions (step S619, corresponding to step S515). As a result, when it is settled that the user X boards the self-driving vehicle 100A, the server apparatus 200 notifies the user apparatus 300X that boarding is settled, and also grants an incentive for the pickup-delivery work to the user X (step S621, corresponding to step S519).

Here, it is assumed, for example, that the response from the user U about pickup-delivery work (step S607) indicates that it is desired to have the pickup-delivery work be handled, and the user X can handle the pickup-delivery work (step S615, corresponding to step S513). In such a case, the boarding processing section 2c of the boarding management section 2044 determines whether or not the request for boarding of the user X meets the predetermined conditions. The request for boarding is for boarding from the bus stop BS1 on the pickup-delivery route R to the bus stop BS2 on the same pickup-delivery route R. The bus stop BS2 is located within the predetermined distance range from the pickup-delivery location P1 and on a return route of the self-driving vehicle traveling back from the pickup-delivery location P1 to the center C. Accordingly, in such a case, the boarding processing section 2c of the boarding management section 2044 can determine that the condition of the request for boarding meets the predetermined conditions (affirmative determination in step S515).

When boarding is settled, processing for associating the boarding information with the pickup-delivery information (step S623, corresponding to step S529), processing for generating an operational instruction (step S625, corresponding to step S531), and processing for providing the operational instruction (step S627, corresponding to step S533) are performed.

Processing in the information processing apparatus 102 of the self-driving vehicle 100A having received the operational instruction will be described based on a flowchart in FIG. 7. The information acquisition section 1041 of the control section 104 of the self-driving vehicle 100A acquires the information in the operational instruction from the server apparatus 200 (step S701). The schedule generation section 1042 of the control section 104 generates a schedule of operation, based on the operational instruction, particularly the pickup-delivery information and the boarding information in the operational instruction (step S703). Although the schedule generation section 1042 generates the schedule of operation, basically based on the pickup-delivery information and the boarding information, the schedule generation section 1042 generates the schedule of operation, taking into consideration a state of a road on the day, for example, road closure information and the like. For example, the following schedule of operation is generated: the self-driving vehicle 100A traveling toward the pickup-delivery location P1 along the pickup-delivery route R allows the user X to board at the bus stop BS1 on the way, allows the user X to handle the pickup-delivery work at the pickup-delivery location P1, and thereafter allows the user X to alight at the bus stop BS2 on the return journey. The task control section 1044 of the control section 104 of the self-driving vehicle 100A then carries out operation based on the schedule of operation, while paying attention to the scheduled times of passing (step S705). Note that through the operation, when the self-driving vehicle 100A delivers pizza to the user U, the user X can be used for a handler of the pickup-delivery work, that is, a deliverer of pizza.

Note that although a case of delivering pizza is described as an example, the same is true, for example, with a case of picking up an item. In the case of picking up an item, the user U is a user who consigns an item. In such a case, the self-driving vehicle 100A also allows the user X to board on the way while moving toward a pickup-delivery location, and the user X can receive an item from the user U at the pickup-delivery location and takes the item to the self-driving vehicle.

As described above, according to the embodiment, it is possible to solicit a user who desires to board a self-driving vehicle engaged in pickup-delivery, and to have the user handle pickup-delivery work at a pickup-delivery location. Thus, in a pickup-delivery service, it is possible to ideally perform pickup-delivery work between a self-driving vehicle for pickup-delivery of an item and a user of the service.

According to the embodiment, in a case of delivering pizza, which is food, the user U, who is a pickup-delivery service user, does not go to the self-driving vehicle to fetch the pizza but can receive the pizza from the user X, that is, a person. Such reception from a person helps the user U feel that the food "pizza" tastes more delicious.

Moreover, according to the embodiment, only one seat of the riding capacity of a self-driving vehicle is assigned for a user who can handle pickup-delivery work. Accordingly, except for the one seat, the self-driving vehicle can serve as a shared transport system in a local area.

Next, a second embodiment will be described. In the following, a description will be given mainly of differences in a pickup-delivery system according to the second embodiment from the pickup-delivery system S according to the first embodiment. Components corresponding to the already described components are similarly denoted by the same numerals, and an overlapping description is omitted.

In the pickup-delivery system S according to the first embodiment, a user who desires to board a self-driving vehicle is solicited by publicizing schedule information on pickup-delivery on the predetermined site and notifying the schedule information to the terminals of the registered users. In the second embodiment, users who desire to board are solicited beforehand, and in order to identify a user who desires to board a self-driving vehicle engaged in pickup-delivery among the users, extraction of a registered user with a movement schedule that meets schedule information on the pickup-delivery and a predetermined condition is performed. In the following, first, a server apparatus 200 in the system according to the second embodiment will be described based on FIG. 8.

Figure 8:
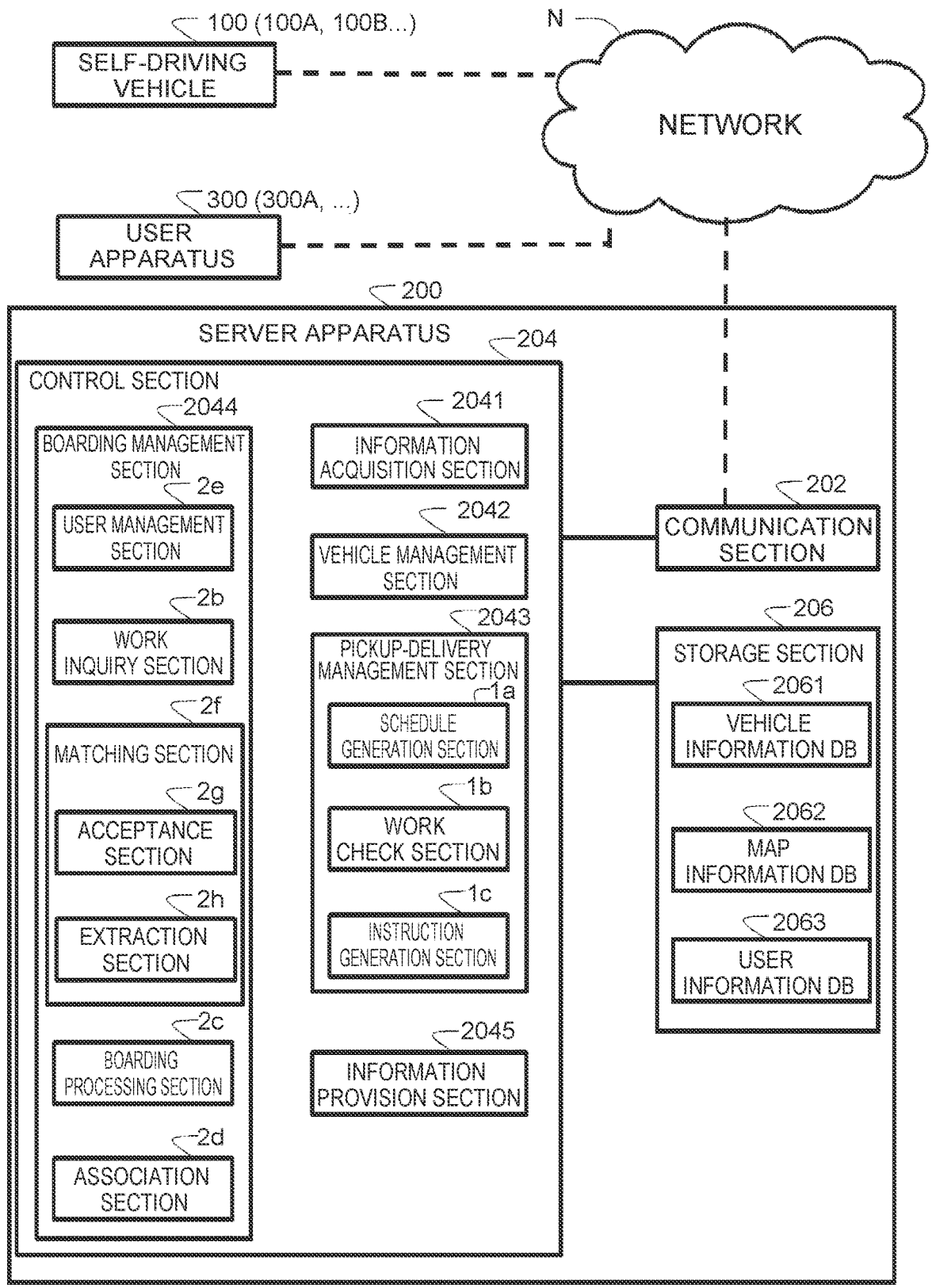
FIG. 8 is a block diagram schematically showing a configuration of a system according to a second embodiment, particularly showing a configuration of a server apparatus.

The server apparatus 200, which is an information processing apparatus, is different from the server apparatus 200 according to the first embodiment in components of the control section 204. As shown in FIG. 8, the control section 204 includes, as function modules, the information acquisition section 2041, the vehicle management section 2042, the pickup-delivery management section 2043, the boarding management section 2044, and the information provision section 2045, but components of the boarding management section 2044 are different. The boarding management section 2044 includes a user management section 2e and a matching section 2f, and also the work inquiry section 2b, the boarding processing section 2c, and the association section 2d. The matching section 2f includes an acceptance section 2g and an extraction section 2h. Each of the function modules is implemented in such a manner that a program stored in the main storage section or the storage section 206 is executed by the CPU of the control section 204.

The user management section 2e of the boarding management section 2044 of the control section 204 accepts a movement schedule from a user apparatus 300 that is a terminal of a registered user via the information acquisition section 2041. The movement schedule includes scheduled times of movement and a scheduled movement route. The accepted movement schedule is stored in the user information database 2063 of the storage section 206 in a retrievable manner. Note that the user information database 2063 is constructed in such a manner that information on a registered user (for example, a user ID) associated with a movement schedule can be acquired based on the movement schedule. Note that the movement schedule of the registered user accepted by the user management section 2e is provided for use in matching processing performed by the matching section 2f. Accordingly, registered users with movement schedules that are accepted and stored are users who desire to board a self-driving vehicle.

When a request for pickup-delivery is received from the user apparatus 300A of the user U who is a pickup-delivery service user, the matching section 2f accepts schedule information on the pickup-delivery and extracts a registered user with a movement schedule that meets the schedule information and the predetermined condition. When the request for pickup-delivery is received from the user apparatus 300A, the schedule generation section 1a of the pickup-delivery management section 2043 generates the schedule information. The acceptance section 2g of the matching section 2f of the boarding management section 2044 accepts the schedule information. The accepted schedule information on the pickup-delivery includes a pickup-delivery route, a scheduled time of pickup-delivery, and scheduled times of passing the pickup-delivery route. The extraction section 2h of the matching section 2f of the boarding management section 2044 extracts a movement schedule of a registered user that meets the pickup-delivery schedule and the predetermined condition, and identifies the registered user with the movement schedule as a user who desires to board a self-driving vehicle engaged in the pickup-delivery. Note that an inquiry of the identified user who desires to board about pickup-delivery work is performed by the work inquiry section 2b.

Figure 9:
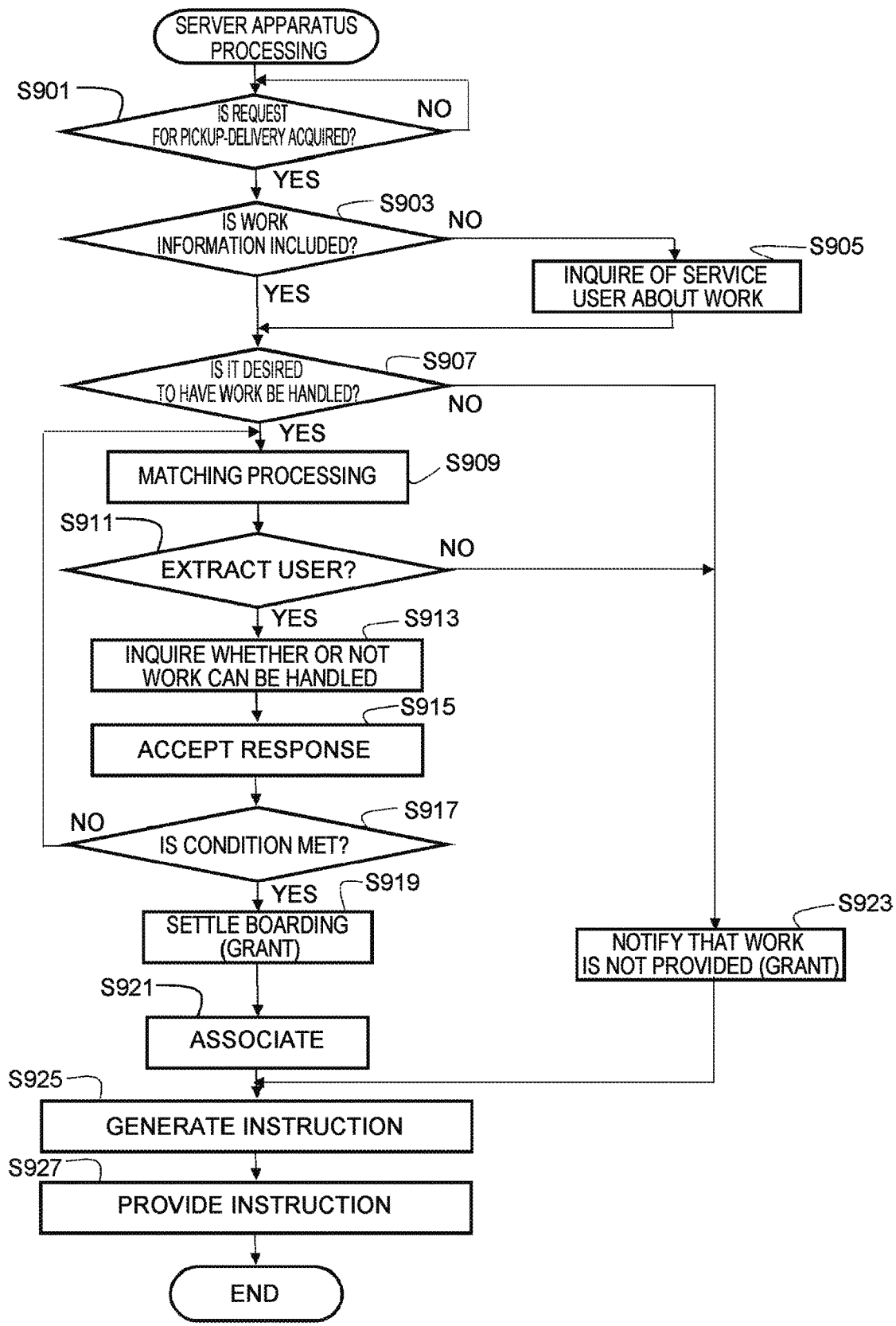
FIG. 9 is flowchart of processing in the server apparatus, in the system according to the second embodiment.

Processing by the control section 204 of the server apparatus 200 will be described based on a flowchart in FIG. 9. Note that the flowchart in FIG. 9 shows an example of processing in a case where the riding capacity of the self-driving vehicle 100A is one person, and the riding capacity of one person is assigned to a user who handles pickup-delivery work.

When a request for pickup-delivery from the user U who desires to use the pickup-delivery service is transmitted from the user apparatus 300A, the schedule generation section 1a of the pickup-delivery management section 2043 in the control section 204 of the server apparatus 200 acquires the request for pickup-delivery (affirmative determination in step S901). Here, it is determined whether or not information about pickup-delivery work is included in the request for pickup-delivery (step S903). When information about pickup-delivery work is not included in the request for pickup-delivery, the work check section 1b of the pickup-delivery management section 2043 in the control section 204 of the server apparatus 200 inquires of the user apparatus 300A of the user U whether or not it is desired to have the pickup-delivery work be handled (step S905).

Since the request for pickup-delivery is accepted, the schedule generation section 1a of the pickup-delivery management section 2043 in the control section 204 of the server apparatus 200 generates schedule information on the pickup-delivery. At the time, the schedule generation section 1a determines the self-driving vehicle 100A as a mobile object engaged in the pickup-delivery.

On the other hand, the user management section 2e of the server apparatus 200 receives movement schedules transmitted by user apparatuses 300 used by users who desire to board a self-driving vehicle 100 engaged in pickup-delivery, among registered users, via the information acquisition section 2041. Each movement schedule includes scheduled times of movement and a scheduled movement route, as described above. The user management section 2e stores the movement schedules in the user information database 2063 of the storage section 206 in a retrievable manner.

In a state where the movement schedules of the registered users are thus stored, the work inquiry section 2b of the boarding management section 2044 determines whether or not it is desired by the user U to have the pickup-delivery work be handled (step S907) as a result of an inquiry about whether or not it is desired to have the pickup-delivery work be handled (step S905). When it is desired by the user U to have the pickup-delivery work be handled (affirmative determination in step S907), the work inquiry section 2b causes the schedule information on the pickup-delivery generated by the schedule generation section 1a to be transmitted to the matching section 2f. The acceptance section 2g of the matching section 2f accepts the schedule information transmitted by the schedule generation section 1a. The extraction section 2h of the matching section 2f then performs matching processing (step S909). By performing the matching processing in accordance with a predetermined program, the extraction section 2h of the matching section 2f extracts a movement schedule that meets the schedule information on the pickup-delivery and the predetermined condition. Since the movement schedule is stored in the user information database 2063 in association with a registered user, the associated registered user is extracted by extracting the movement schedule. Here, a description will be given below assuming that the user X is extracted as the registered user.

As a result of the matching processing, when the registered user X can be extracted (affirmative determination in step S911), the work inquiry section 2b of the boarding management section 2044 inquires of the user apparatus 300X that is a terminal of the extracted registered user X whether or not the pickup-delivery work can be handled (step S913). The work inquiry section 2b of the boarding management section 2044 in the control section 204 of the server apparatus 200 can accept a response about the pickup-delivery work from the user apparatus 300X (step S915). The response then accepted also includes a condition of boarding of the user X. A reason is that the movement schedule of the registered user may have been changed.

The boarding processing section 2c of the boarding management section 2044 determines whether or not the request for boarding of the user X who desires to board meets the predetermined condition for boarding (step S917). For the predetermined condition, it is assumed that a boarding place and an alighting place desired by the user X are located within a predetermined range from the pickup-delivery route for the user U, or the like.

When the request for boarding of the user X meets the predetermined condition (affirmative determination in step S917), boarding of the user X is settled, and an incentive is granted to the user X (step S919). For example, thus, a boarding fee for the self-driving vehicle 100A is reduced by an amount equivalent to a fee for the pickup-delivery work, for example, is waived. Boarding information on the user, boarding of which is thus settled, is associated with the pickup-delivery information (step S921). The association is performed as already described in the first embodiment.

On the other hand, when the request for boarding of the user X does not meet the predetermined condition (negative determination in step S917), the matching processing (step S909) is repeated. However, when no user can be extracted as a result (negative determination in step S911), a notification indicating that the pickup-delivery work is not provided is transmitted to the user apparatus 300A because there is no user who can handle the pickup-delivery work (step S923). Note that the user U having received the notification indicating that the pickup-delivery work is not provided as a result of negative determination in step S911 can cancel the pickup-delivery.

When a response indicating that the pickup-delivery work is unneeded is received from the user U (negative determination in step S907), a notification indicating that the pickup-delivery work is not provided is also transmitted to the user apparatus 300A (step S923). When it is notified that the pickup-delivery work is not provided, an incentive is granted to the user U (step S923). When the response indicating that the pickup-delivery work is unneeded is received (negative determination in step S907), the inquiry of the user apparatus 300X of the user X about whether or not the pickup-delivery work can be handled is stopped, as apparent from FIG. 9.

An operational instruction is then generated and provided, based on information on the pickup-delivery work with which the boarding information is associated or is not associated (step S925, S927). The processing is similar to steps S531 and S533 in FIG. 5 in the first embodiment.

Figure 10:
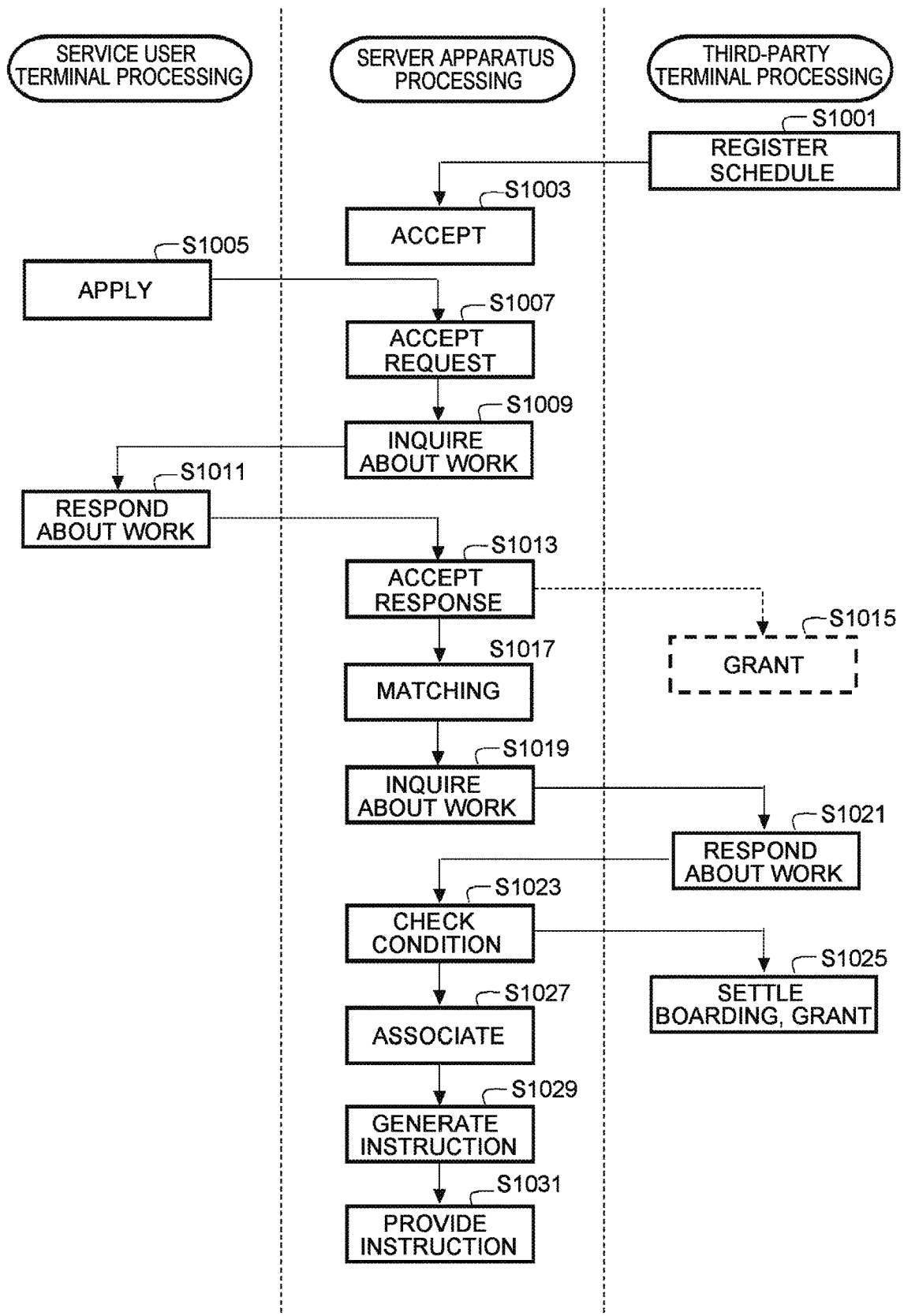
FIG. 10 is a diagram for describing an example of processing among the server apparatus, a terminal of a pickup-delivery service user, and a terminal of a third party who desires to board, in the system according to the second embodiment.

The processing in the server apparatus 200 described based on FIG. 9 will further be described based on FIG. 10. FIG. 10 is a diagram corresponding to FIG. 6 in the first embodiment. Note that the processing in FIG. 10 is an example of processing in a case where the riding capacity of the self-driving vehicle 100A is one person.

When a movement schedule is registered by a user apparatus 300 of a registered user who is irrelevant to pickup-delivery (step S1001), the user management section 2e of the server apparatus 200 accepts and stores the movement schedule (step S1003).

On the other hand, when the user U performs transmission for applying a request for pickup-delivery via the user apparatus 300A (step S1005), the server apparatus 200 receives and accepts the request for pickup-delivery (step S1007, corresponding to step S901). When a request for pickup-delivery work is not included in the request for pickup-delivery, the server apparatus 200 transmits to the user apparatus 300A an inquiry about whether or not it is desired to have the pickup-delivery work be handled (step S1009, corresponding to step S905). The user apparatus 300A receives the inquiry and transmits here a response of the user U about the pickup-delivery work to the server apparatus 200 (step S1011). In the response, when the pickup-delivery work is unneeded, an incentive for the pickup-delivery work is granted to the user U (step S1015, corresponding to step S923).

The server apparatus 200 having accepted the request for pickup-delivery, in order to identify a user who desires to board the self-driving vehicle 100A engaged in the pickup-delivery for the user U, performs the matching processing (step S1017, corresponding to step S909). When the response of the user U about the pickup-delivery work (step S1011) indicates that it is desired to have the pickup-delivery work be handled, matching is performed (S1017). The server apparatus 200 inquires of the user apparatus 300X of the user X identified as a result of the matching processing whether or not the pickup-delivery work can be handled (step S1019, corresponding to step S913). In response, when the user X can handle the pickup-delivery work, a response indicating that the pickup-delivery work can be handled is returned; otherwise a response indicating that the pickup-delivery work cannot be handled is returned (step S1021).

When the request for boarding of the user X is registered, and when the response about the pickup-delivery work is received from the user apparatus 300X, it is determined whether or not a condition of the request for boarding meets the predetermined condition (step S1023, corresponding to step S917). As a result, when it is settled that the user X boards the self-driving vehicle 100A, the server apparatus 200 notifies the user apparatus 300X that boarding is settled and also grants an incentive for the pickup-delivery work to the user X (step S1025, corresponding to step S919).

When boarding is settled, processing for associating the boarding information with the pickup-delivery information (step S1027, corresponding to step S921), processing for generating an operational instruction (step S1029, corresponding to step S925), and processing for providing the operational instruction (step S1031, corresponding to step S927) are performed.

Figure 7:
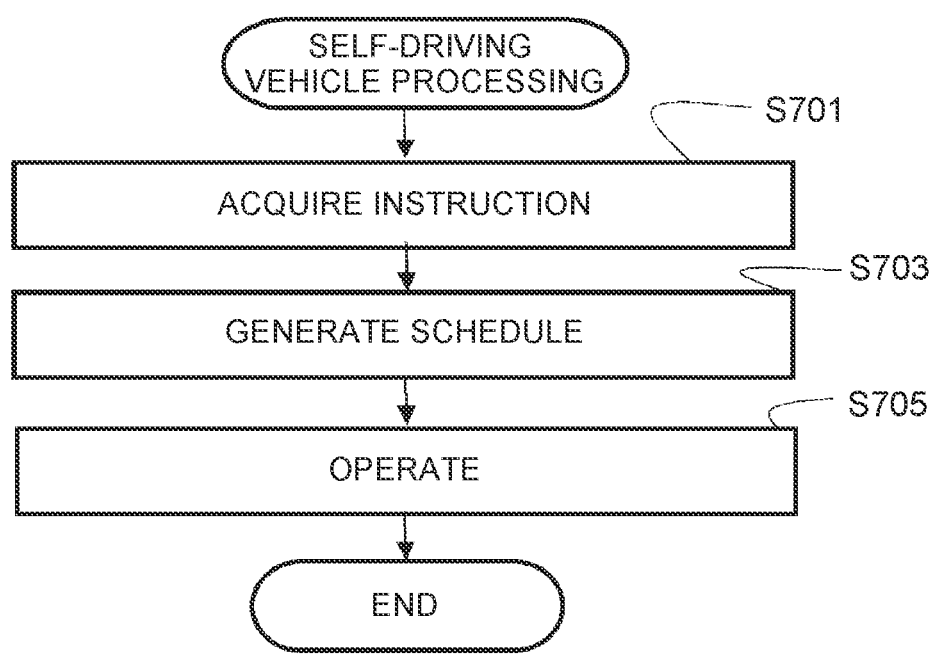
FIG. 7 is a flowchart of processing in a self-driving vehicle, in the system in FIG. 1.

Processing in the self-driving vehicle 100A having received the operational instruction is as described based on FIG. 7 in the first embodiment.

As described above, in the second embodiment, it is also possible to have a user who desires to board a self-driving vehicle engaged in pickup-delivery handle pickup-delivery work at a pickup-delivery location. Thus, in a pickup-delivery service, it is possible to ideally perform pickup-delivery work between a self-driving vehicle for pickup-delivery of an item and a user of the service.

According to the second embodiment, movement schedules of registered users who desire to board a self-driving vehicle engaged in pickup-delivery are accepted beforehand, and the matching processing is performed when a request for pickup-delivery is received. Thus, a user who desires to board can be identified more promptly. In addition, by inquiring of such a registered user whether or not pickup-delivery work can be handled, a chance of securing a handler of pickup-delivery work can be enhanced more ideally.

Note that in the second embodiment, when a user who can handle pickup-delivery work cannot be determined, a user who desires to board may be solicited by notifying or publicizing schedule information as described in the first embodiment. Then, it may be inquired of the user who desires to board whether or not the pickup-delivery work can be handled.

The embodiments described above are only examples, and changes can be made to the disclosure as appropriate without departing from the scope of the disclosure. The processing and means described in the disclosure can be combined arbitrarily to the extent that no technical inconsistency arises.

The processing described on the assumption that the processing is performed by a single apparatus may be divided and performed by a plurality of apparatuses. For example, each of the server apparatus 200, which is an information processing apparatus, and the information processing apparatus 102 of each self-driving vehicle 100 does not need to be a single computer but may be configured as a system including a plurality of computers. Alternatively, the processing described on the assumption that the processing is performed by different apparatuses may be performed by a single apparatus. In a computer system, it can be flexibly changed what hardware component or components (server component or components) are used to implement each function.

The disclosure can also be implemented by providing a computer program packaging the functions described in the embodiments to a computer and causing one or more processors included in the computer to read and execute the program. Such a computer program may be provided to the computer through a non-transient computer-readable storage medium that can connect to a system bus of the computer, or through a network. Examples of the non-transient computer-readable storage medium include any types of disk such as magnetic disks (floppy(R) disk, hard disk drive (HDD), and the like) and optical disks (CD-ROM, DVD disk, Blu-ray disk, and the like), a read only memory (ROM), a random access memory (RAM), an EPROM, an EEPROM, a magnetic card, a flash memory, an optical card, and an any type of medium suitable for storing electronic instructions.

What is claimed is:

1. An information processing system, comprising:
a self-driving vehicle that operates for pickup-delivery of an item; and
at least one processor configured to:
identify a user who desires to board the self-driving vehicle and desires a boarding place and an alighting place that are located within a predetermined range from a pickup-delivery route of the self-driving vehicle, the user being a registered user with a movement schedule that meets schedule information on the pickup-delivery;
inquire of a terminal of the user, whether or not the user is able to handle work of pickup-delivery of the item at a pickup-delivery location between the self-driving vehicle and a pickup-delivery service user;
when a response indicating that the user is able to handle the work of pickup-delivery when the user is on board the self-driving vehicle is received from the terminal, transmit an operation instruction to the self-driving vehicle to control the self-driving vehicle to autonomously travel to the boarding place of the user and allow the user to board the self-driving vehicle; and
grant an incentive to the user who accepts handling the work of pickup-delivery.

2. The information processing system according to claim 1, wherein the at least one processor is further configured to:
in order to solicit the user who desires to board the self-driving vehicle, publicize the schedule information on the pickup-delivery on a predetermined site or notifying the schedule information to a terminal of the registered user; and accept a request for boarding from the user via the predetermined site or the terminal of the registered user.

3. The information processing system according to claim 1, wherein the at least one processor is further configured to, when a response indicating that the work of pickup-delivery is unneeded is received from a terminal of the pickup-delivery service user, stop inquiring whether or not the user is able to handle the work of pickup-delivery.

4. The information processing system according to claim 3, wherein the at least one processor is further configured to, when the response indicating that the work of pickup-delivery is unneeded is received from the terminal of the pickup-delivery service user, grant the incentive to the pickup-delivery service user.

5. An information processing method, comprising: by at least one computer, identifying a user who desires to board a self-driving vehicle and desires a boarding place and an alighting place that are located within a predetermined range from a pickup-delivery route of the self-driving vehicle, the user being a registered user with a movement schedule that meets schedule information on the pickup-delivery; inquiring of a terminal of the user, whether or not the user is able to handle work of pickup-delivery of the item at a pickup-delivery location between the self-driving vehicle and a pickup-delivery service user; when a response indicating that the user is able to handle the work of pickup-delivery when the user is on board the self-driving vehicle is received from the terminal, transmitting an operation instruction to the self-driving vehicle to control the self-driving vehicle to autonomously travel to the boarding place of the user and allow the user to board the self-driving vehicle; and granting an incentive to the user who accepts handling the work of pickup-delivery.

6. The information processing method according to claim 5, comprising: by the at least one computer, in order to solicit the user who desires to board the self-driving vehicle, publicizing the schedule information on the pickup-delivery on a predetermined site or notifying the schedule information to a terminal of the registered user; and accepting a request for boarding from the user via the predetermined site or the terminal of the registered user.

7. The information processing method according to claim 5, further comprising: by the at least one computer, inquiring of a terminal of the pickup-delivery service user whether or not it is desired to have the work of pickup-delivery be handled; and when a response indicating that the work of pickup-delivery is unneeded is received from the terminal of the pickup-delivery service user, stopping inquiring whether or not the user is able to handle the work of pickup-delivery.

8. The information processing method according to claim 7, further comprising: by the at least one computer, when the response indicating that the work of pickup-delivery is unneeded is received from the terminal of the pickup-delivery service user, granting the incentive to the pickup-delivery service user.

9. A non-transitory computer-readable storage medium storing therein a computer program for causing at least one processor to: identify a user who desires to board the self-driving vehicle and desires a boarding place and an alighting place that are located within a predetermined range from a pickup-delivery route of the self-driving vehicle, the user being a registered user with a movement schedule that meets schedule information on the pickup-delivery; inquire of a terminal of the user, whether or not the user is able to handle work of pickup-delivery of the item at a pickup-delivery location between the self-driving vehicle and a pickup-delivery service user; when a response indicating that the user is able to handle the work of pickup-delivery when the user is on board the self-driving vehicle is received from the terminal, transmit an operation instruction to the self-driving vehicle to control the self-driving vehicle to autonomously travel to the boarding place of the user and allow the user to board the self-driving vehicle; and grant an incentive to the user who accepts handling the work of pickup-delivery.

10. The information processing system according to claim 1, wherein the at least one processor further configured to: when the response indicating that the user is able to handle the work of pickup-delivery when the user is on board the self-driving vehicle is received from the terminal, transmit to the self-driving vehicle an instruction to transport the user to a predetermined point.

11. The information processing system according to claim 1, wherein the pickup-delivery service user is different from the user who desires to board the self-driving vehicle.

* * * * *